(12) United States Patent
Davis

(10) Patent No.: US 9,800,550 B2
(45) Date of Patent: Oct. 24, 2017

(54) METHOD AND SYSTEM FOR PERVASIVE ACCESS TO SECURE FILE TRANSFER SERVERS

(75) Inventor: Brent E. Davis, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 1929 days.

(21) Appl. No.: 12/023,234

(22) Filed: Jan. 31, 2008

(65) Prior Publication Data

US 2009/0199289 A1    Aug. 6, 2009

(51) Int. Cl.
*G06F 17/00* (2006.01)
*G06F 21/00* (2013.01)
*H04L 29/06* (2006.01)

(52) U.S. Cl.
CPC ........ *H04L 63/0281* (2013.01); *H04L 63/168* (2013.01)

(58) Field of Classification Search
CPC ... H04L 63/10; H04L 63/0227; H04L 63/105; H04L 67/28
USPC .......................................................... 726/12
See application file for complete search history.

(56) References Cited

U.S. PATENT DOCUMENTS

| | | | |
|---|---|---|---|
| 6,104,716 A | 8/2000 | Crichton | |
| 6,321,337 B1* | 11/2001 | Reshef et al. | 726/14 |
| 6,385,644 B1* | 5/2002 | Devine | G06F 11/0709 707/E17.107 |
| 6,970,942 B1* | 11/2005 | King et al. | 709/238 |
| 7,003,799 B2* | 2/2006 | Jorgenson | 726/12 |
| 2002/0023210 A1* | 2/2002 | Tuomenoksa et al. | 713/161 |
| 2003/0191935 A1* | 10/2003 | Ferguson | H04W 12/02 713/153 |
| 2005/0198380 A1* | 9/2005 | Panasyuk | H04L 12/4633 709/239 |
| 2006/0190723 A1 | 8/2006 | Benson | |
| 2007/0074280 A1* | 3/2007 | Callaghan | H04L 69/08 726/12 |
| 2007/0204003 A1* | 8/2007 | Abramson | 709/217 |
| 2007/0242680 A1* | 10/2007 | Signaoff et al. | 370/401 |
| 2008/0008211 A1* | 1/2008 | Zilbershtein et al. | 370/466 |
| 2008/0178278 A1* | 7/2008 | Grinstein | H04L 63/0227 726/12 |

FOREIGN PATENT DOCUMENTS

WO    2006/071894    7/2006

* cited by examiner

*Primary Examiner* — Matthew Henning
(74) *Attorney, Agent, or Firm* — Whitham, Curits & Cook, PC; John R. Pivnichny

(57) ABSTRACT

End-to-end file transfer security for file transfer is provided over a network such as the Internet between a client, using a secure communication protocol which is pervasively available, such as HTTPS, to a secure file server which is accessible only through a secure file transfer protocol which is not pervasively available by using a secure proxy for accessing the secure file server rather than providing a protocol break merely for traversing a firewall. The secure proxy is arranged to provide a protocol conversion between the pervasively available secure protocol and the communication protocol through which the server is accessible and which is not pervasively available. By doing so, the secure proxy inherits secure functions of the secure server which thus need not be separately or independently provided in the secure proxy.

15 Claims, 3 Drawing Sheets

METHOD AND SYSTEM FOR PERVASIVE ACCESS TO SECURE FILE TRANSFER SERVERS

BACKGROUND OF THE INVENTION

Field of the Invention

The present invention generally relates to a system and method for secure file transfer over the Internet or other networks and, more particularly for providing secure transmission of files from the source or point of origin to the final (client or server) destination.

Description of the Prior Art

The Internet and other networks to which many users have access, even if operated as a private network, have proven to be a substantial convenience for the transfer of data and applications between users but are often not secure, allowing access to information to persons other than the person for whom the data or application was intended or that data or applications could be intercepted, altered or corrupted incident to an intrusion. As usage of such networks has grown in recent years, there has been an increasing need for businesses and individuals to securely transfer sensitive or confidential information, preferably without file encryption which is processing intensive and does not insure complete file integrity. At the same time, defenses such as so-called firewalls have been developed to avoid or lessen the effects of intrusions into communications between users of a given network while some protocols have been developed which are specifically intended for secure file transfer.

At the present time, there are two such standard Internet file transfer protocols (FTP) which provide robust and secure file transfer and management capabilities. These secure file transfer protocols are known as FTP over SSL or TLS (FTPS) as provided by Ford-Hutchinson in "IETF RFC 4217 Securing FTP with TLS, 2005, and FTP over SSH (SFTP or SCP) as provided by Galbraith, Van Dyke Software, Saarenmaa, F-Secure, "IETF draft RFC SSH File Transfer Protocol", 2006, both of which are hereby fully incorporated by reference. While these protocols are effective for secure file transfer and are well-accepted, some issues involving these protocols have precluded widespread use.

Specifically, at the present time, secure client software that supports these recently developed protocols is not pervasively available on all computer platforms. Additionally, some enterprises may be unable or unwilling to implement Internet firewall changes required for use of these protocols over public networks and some private networks.

In contrast therewith, a known HTTP over SSL (HTTPS) protocol is widely accepted and used extensively for secure web transactions over the Internet. Web browsers and line mode HTTPS clients are available for virtually all computing platforms. Enterprises generally allow HTTPS protocol to flow through their Internet firewalls. Because of this, HTTPS is frequently a preferred protocol for use by businesses and consumers. However, the HTTPS protocol was designed for display of web pages and not specifically for transfer of files and management of transferred files.

Examples of some network architectures where HTTP or HTTPS protocols are used for providing secure file transfer across a network (e.g. Internet) link are outlined in U.S. Pat. No. 7,003,799 B2 To Jorgenson. However, in the exemplary architectures disclosed therein, secure protocols are only used for access to a transport gateway or transport proxy at the supplier node while communication with the file repositories (e.g. servers) within the supplier node are conducted using non-secure protocols (or HTTPS for repositories which are HTTP servers which supply information in a web page format as distinct from data files). Thus, the exemplary network architectures disclosed by Jorgenson do not provide for secure file transfer within the supplier node and, as is well-recognized in the art, an attack on a file may occur at any non-secure point where a file may temporarily reside, such as at proxies or gateways which are required for "protocol breaks" where a transmission protocol may be changed, as is often the case for transmission across firewalls and at non-secure servers (e.g. servers accessible through non-secure protocols). That is, use of a non-secure proxy is unacceptable where files must be transferred securely from point of origin (e.g. a server or repository) to the final destination, sometimes referred to as end-to-end security. While HTTP or HTTPS to FTP proxies are known, as used in some of the exemplary network architectures of Jorgenson, there are presently no proxies that support use of secure FTP over SSH/TLS (FTPS) or SSH (SFTP or SCP) to access a secure server and thus end-to-end security cannot be provided using pervasively available protocols such as HTTPS.

SUMMARY OF THE INVENTION

It is therefore an object of the present invention to provide a network architecture capable of providing end-to-end security for transfer of files by providing for use of a secure file transfer protocol within a supplier node for communication with a server or file repository therein through provision of a secure proxy using a network transmission protocol which is pervasively available.

In order to accomplish these and other objects of the invention, a client-server connection over a network is provided including a secure server accessible using a first secure communication protocol which is not pervasively available, and a secure proxy capable of performing protocol conversion between the first secure communication protocol and a second pervasively available secure communication protocol and capable of accessing the secure server using the first secure communication protocol.

In accordance with another aspect of the invention, a method and computer readable medium providing program signals for control of a computer to perform such a method of providing end-to-end security for file transfer over a network and wherein a secure file server is accessible through a communication protocol which is not pervasively available is provided comprising steps of establishing a secure link across the network from a client to a secure proxy using a pervasively available secure communication protocol, establishing a secure link from the secure proxy to the secure file server using the communication protocol which is not pervasively available, performing a conversion between the pervasively available secure communication protocol and the secure communication protocol which is not pervasively available at the secure proxy, and transferring a file between the secure server and the client using the pervasively available secure protocol between the client and the secure proxy and using the secure communication protocol which is not pervasively available between the secure proxy and the secure server.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
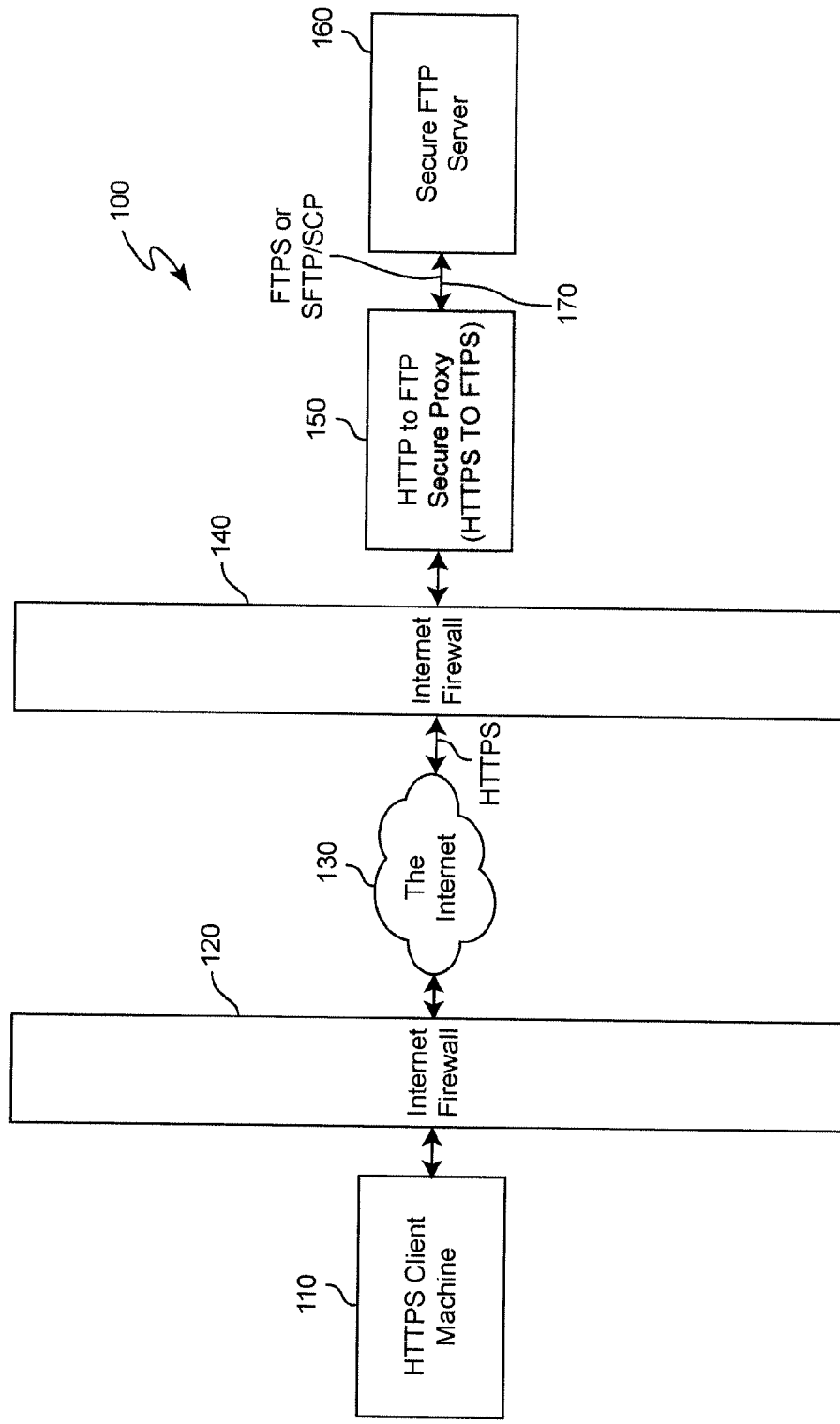
FIG. 1 is a block diagram of a preferred architecture for implementation of the invention.

Referring now to the drawings, and more particularly to FIG. 1, there is shown a block diagram of a preferred architecture 100 for implementation of the invention. The illustrated architecture is intended to be exemplary and, for simplicity and clarity, shows only a single client-server connection for transfer of a file from the server to a client which requests the file.

HTTPS client machine 110 is constituted, for example, by a web browser or line mode HTTPS client executing on a business or consumer machine. As indicated above, the HTTPS protocol is, at the present time, pervasively available on most computing platforms for transfer of web pages. Firewall 120 faces the network (e.g. Internet) 130 and protects HTTPS client machine 130 from undesired communications, security attacks and the like but secure protocols such as HTTPS may be allowed to flow therethrough, as noted above. Firewall 140 at the server node of the network also faces the network and has essentially the same function as firewall 120 at the client node. Firewalls 120 and 140 may each be configured as desired for protection of their respective network nodes as long as HTTPS and similar pervasively available secure protocol communications are allowed to pass.

The server node includes a secure proxy 150 which can provide a protocol conversion from HTTPS or similar pervasively available protocols to a secure FTPS or SFTP/SCP or the like protocol and a secure FTP server 160 which may only be accessed by a secure file transfer protocol such as FTPS or SFTP/SCP or similar secure protocol. Therefore, secure proxy 150, secure server 160 the link 170 between them are all made secure. Since the remainder of the link over the network (e.g. Internet) is made using secure HTTPS protocol or similarly pervasively available secure protocol, end-to-end security for transfer of a requested file is provided from the file source server 160 to the client machine 110. Further, no modification of the client node or its firewall configuration and/or function is required in view of the provision of a single secure proxy 150 in the server node to access a secure repository using a secure file transfer protocol (and which can thus service as many file repositories as may be provided at that network node) while secure access to the secure proxy and thence to the secure server may be made from a client server using a secure communication protocol which is pervasively available while the secure communication protocol required to access a secure repository may not similarly be pervasively available.

Further, it should be understood and appreciated that proxies are generally used (as noted in Jorgenson, incorporated by reference above) to allow communications across firewalls by providing an appropriate "protocol break" relative to the preferred configuration of the firewall at the node. Particularly since the protocol conversion provided by secure proxy 150 is not necessary to traverse the firewall, the much different function of providing access to a secure server 160 may be addressed by the protocol conversion provided by secure proxy 150.

Figure 2:
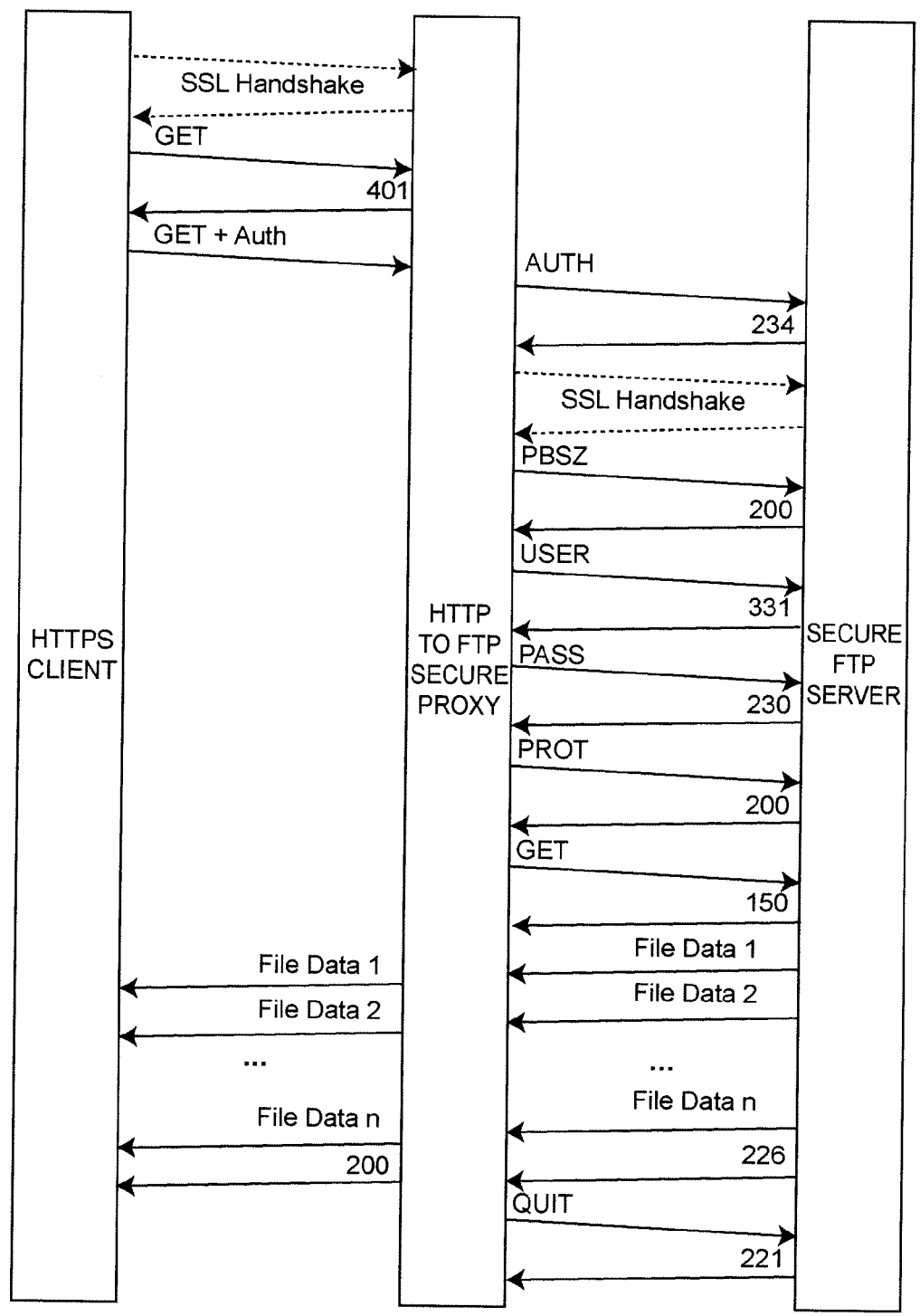
FIGS. 2 and 3 illustrate sequences of transmissions and replies between a client, secure proxy and secure server for end-to-end secure downloading (server to client) and uploading (client to server) of files in accordance with the invention.
Figure 3:
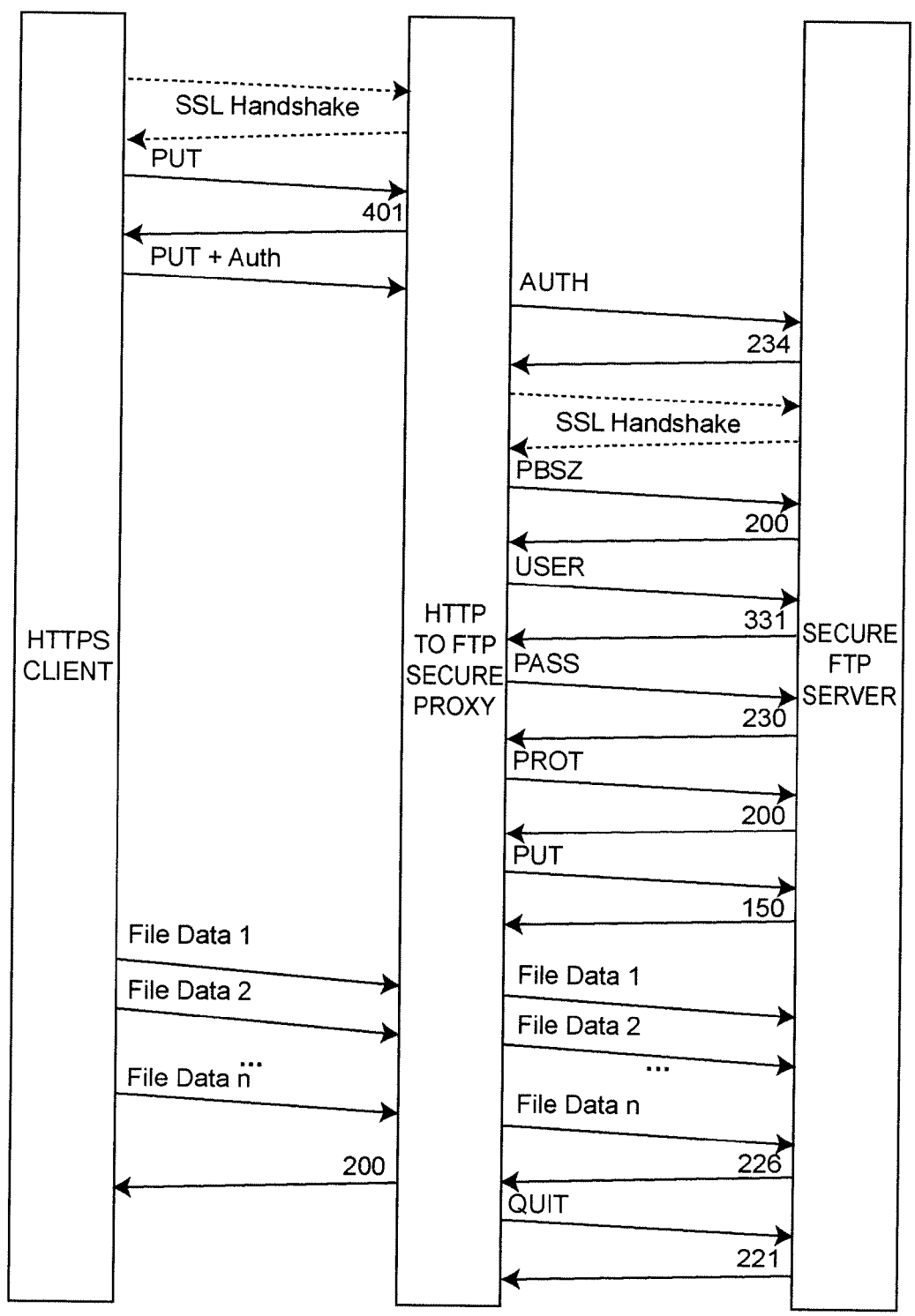

Referring now to FIGS. 2 and 3, examples of data exchanges for downloading and uploading of files, respectively, will now be explained. It should be recognized that the functionality of the secure proxy will be greatly simplified in accordance with the invention by inheritance of security functions from the secure server implementing secure file transfer protocols. Specifically, while web server application code may be used to directly support HTTPS file transfer, a secure HTTPS to secure FTP (FTPS) proxy also eliminates the need to replicate function that may (and generally is) already available in a secure FTP server. This includes such items or function as user authentication, access control, automated file processing or other usage restrictions which continue to be provided by the secure FTP server. By the same token, the secure proxy server arranged to operate as depicted in FIGS. 2 and 3 also supports non-secure file transfer as well as secure file transfer and can switch between secure and non-secure functions seamlessly, automatically and transparently based on receiving non-secure or secure input (e.g. from the server).

In other words, by arranging for the communications depicted in FIGS. 2 and 3 to be carried out (which are entirely sufficient to establish end-to-end security for file transfer), the required function of the secure proxy to achieve such file transfer is synergistically simplified while flexibility to accommodate non-secure file transfer is engendered without any need to separately or independently provide such functions in the secure proxy 150. By the same token, the secure proxy 150 can exploit additional potential features which may be provided by a secure server such as providing a "passive" mode transfer.

It should also be recognized that the examples illustrated in FIGS. 2 and 3 correspond to a secure FTP (FTPS) server. However, the basic principles therein which will be evident to those skilled in the art can be readily applied to an embodiment including an SSH FTP secure server as will also be evident to those skilled in the art. Also, for reference, HTTP codes used in FIGS. 2 and 3 and their meanings/functions are:

200 OK
401 Unauthorized and FTP codes and their meanings/functions are:

150 File status OK; about to open data connection
200 Command OK
221 Service closing control connection
226 Closing data connection
230 User logged in, proceed
331 User name OK; need password
234 security data exchange complete.

Referring now to FIG. 2, a file transfer download operation is initiated by a request from the client which begins with a series of request/response interactions referred to as an SSL handshake which has been defined most recently by IETF RFC 2246, the TLS Protocol version 1.0, details of which are unimportant to the practice of the invention. This handshake procedure is followed by a GET request from the client. Since this command is, as yet, unauthorized because a secure link has not been formed, a 401 "unauthorized response is returned from the secure proxy. In response, a GET+Auth request (including authentication information) is issued by the client to deliver security and identification credentials. The handshake followed, for example, by a so-called 401 challenge (indicating that the GET request is unauthorized) and response are merely exemplary of operations to establish a secure link between the client and secure proxy. As an alternative to this exchange and response, the authorization credentials could be supplied through an application level protocol from the HTTPS (or other pervasively available protocol) client.

It should be appreciated that the above communications between the client and the secure proxy are preferably conducted using a HTTPS protocol but that any other pervasively available secure protocol may be used. Similarly, it should be appreciated that the following operations and communications for establishing a secure link between the secure proxy and the secure server are preferably carried out using an FTP over SSL (FTPS) or FTP over SSH (SFTP or SCP) protocol which are known although not pervasively available but the invention is considered to extend to providing secure file transfer access to any secure server through any secure protocol which may not be available to the client. The procedures and operations for closing the link are also performed using these respective protocols. The intervening file transfer operations are also performed using these or similar respective protocols for respective portions of the link (e.g. using a pervasively available secure protocol across the network and a secure protocol which is not pervasively available but appropriate for accessing a secure server between the secure proxy and the secure server. A protocol conversion between the pervasively available protocol and the secure protocol appropriate to the secure server is provided in the secure proxy.

Once the client has thus been authenticated to the secure proxy, the secure proxy need only indicate the successful completion thereof to the secure server by an authorization (AUTH) command (e.g. containing security information previously captured by the secure proxy during the data exchange described above) to the secure server which is answered by a 234 code indicating that the security data exchange, identifying the secure proxy is complete. An SSL handshake operation sequence is then performed between the secure server and the secure proxy. A PBSZ command for setting of the protection buffer size is issued by the secure proxy to the secure server which is acknowledged by a 200 code. The user information is then transmitted to the secure server which then confirms the user to the secure proxy with a 331 code confirming the user authorization and requesting a password (PASS) which is supplied to the secure server. Acceptance of the password is indicated by transmission of code 230. A PROT command is then issued by the secure proxy to establish the desired security level for the file transfer and is acknowledged by a 200 reply to the secure proxy. A GET request is then issued from the secure proxy and a 150 reply code is returned, indicating that the data connection is about to be opened.

Portions or buffers 1 through n of a file are then transmitted from the secure server to the secure proxy and, since the secure data connection from the secure proxy to the client has already been opened, the transferred files are relayed to the client, in turn, using the same security (e.g. encryption) as established during the SSL handshake, in the pervasively available protocol. After the requested files have been transferred from the server a 226 command is issued from the secure server to indicate that the secure data connection will be closed. Completion of the requested file transfer by the secure proxy is then relayed to the client by the secure proxy as a 200 code. The secure proxy then transmits a QUIT command to the secure server and is answered by a 221 code to the secure proxy indicating closing of the service, closing the control connection to complete the end-to-end secure file transfer process. A file transfer completion acknowledgment from the client is preferably not performed at this level but at lower levels in the TCP/IP protocol stack, indicating the final packet of the final transferred file had been received.

The same basic procedure is performed by the uploading operation shown in FIG. 3 except that the file data is sent in the opposite direction and the HTTPS client upload may occur using either a standard PUT or POST request (a PUT request being illustrated) and the transfer of files between the client and server may begin at any time once the secure FTP session is established and the proxy is ready to receive and retransmit the file buffers. In this regard, it should be noted that so-called caching proxies are known which can store data locally and thus allow for even earlier transmission from the client and transmission to the secure server when that link is established. However caching proxies are not preferred in most cases for practice of the invention.

In view of the foregoing, it is seen that the invention, by provision of a secure proxy in a simple manner which also provides for the proxy to use whatever security and security features are provided by a secure server, can provide end-to-end security for transfers of files over a network such as the Internet. Further, this can be done using protocols which are pervasively available for other secure network transactions and communications event though secure file transfer protocols affording access to secure servers may not be similarly pervasively available. Moreover, the secure proxy in accordance with the invention is compatible with all secure and non-secure clients and servers since it may be configured to always use a secure outgoing protocol regardless of the incoming protocol or to use a secure or non-secure protocol depending on whether the incoming protocol is secure or non-secure protocol as well as the function of using a non-secure outgoing protocol; to which known proxies have heretofore been limited.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A client-server connection over a network including firewalls, said client-server connection comprising:
   a secure server device protected by a firewall, said secure server device comprising a processor and a resource and accessible using a first secure communication protocol, and
   a secure proxy device protected by said firewall and capable of performing code conversion between a second pervasively available secure protocol that is permitted to pass through firewalls and said first secure communication protocol, said secure proxy device being capable of accessing said secure server device and providing security functions inherited from said secure server device in response to a command from a client and transferring at least one file using said first secure communication protocol in response to a command received by said secure proxy device from said client over said network using said second pervasively available secure communication protocol whereby an end-to-end secure link is formed for transferring said at least one file from said secure server device to said client that has been authenticated in accordance with security functions of said secure server device.

2. A client-server connection as recited in claim 1 wherein said second pervasively available secure communication protocol is an HTTP over SSL (HTTPS) protocol.

3. A client-server connection as recited in claim 1 wherein said first secure communication protocol is an FTP over SSL (FTPS) protocol.

4. A client-server connection as recited in claim 1 wherein said first secure communication protocol is an FTP over SSH (SFTP or SCP) protocol.

5. A method of providing end-to-end secure file transfer of a file over a network including firewalls and wherein a secure file server device is accessible by a secure proxy server device through a first communication protocol, said method comprising steps of:
 establishing a secure link across said network from a client to a secure proxy device using a second, pervasively available secure communication protocol which is permitted to pass through firewalls,
 establishing a secure link from said secure proxy device to said secure file server device using said first communication protocol,
 performing security functions inherited from said secure server device at said secure proxy device, said secure proxy device performing a conversion between said second pervasively available secure communication protocol which is permitted to pass firewalls and said first secure communication protocol to access said secure server responsive to a command from said client whereby an end-to-end secure link is established from said client to said secure server device, and
 transferring a file between said secure server device and said client over said end-to-end secure link using said second pervasively available secure protocol between said secure proxy device and said client and using said first secure communication protocol between said secure server device and said secure proxy device.

6. A method as recited in claim 5 wherein said pervasively available secure communication protocol is an HTTP over SSL (HTTPS) protocol.

7. A method as recited in claim 5 wherein said secure communication protocol which is not pervasively available is an FTP over SSL (FTPS) protocol.

8. A method as recited in claim 5 wherein said secure communication protocol which is not pervasively available is an FTP over SSH (SFTP or SCP) protocol.

9. A method as recited in claim 5, wherein said step of establishing a secure link across a network includes transmission of authentication credentials using an application level protocol from said client.

10. A method as recited in claim 5, wherein said steps, when performed by a processor, provide the processor with functionality of a secure proxy.

11. A method of providing end-to-end secure file transfer over a network including firewalls and wherein a secure file server device including a resource is accessible through a first secure communication protocol, said method comprising steps of:
 configuring one or more processors to establish a secure proxy device and a secure link across said network from a client to said secure proxy device using a second, pervasively available secure communication protocol that is permitted to pass through a firewall protecting said secure file server device and said secure proxy device,
 configuring said secure proxy device to perform a conversion between said second, pervasively available protocol and said first secure protocol and establish a secure link from said secure proxy device to a secure file server device using said first secure communication protocol responsive to a command from said client,
 configuring said secure proxy device to perform security functions inherited from said secure file server device whereby an end-to-end secure link is formed between said secure file server device and said client through said secure proxy device, and
 configuring said secure proxy device to transfer a file between said secure server device and said client using said second, pervasively available secure protocol between said secure proxy device and said client and using said first secure communication protocol between said secure server device and said secure proxy device.

12. A method as recited in claim 11 wherein said pervasively available secure communication protocol is an HTTP over SSL (HTTPS) protocol.

13. A method as recited in claim 11 wherein said secure communication protocol which is not pervasively available is an FTP over SSL (FTPS) protocol.

14. A method as recited in claim 11 wherein said secure communication protocol which is not pervasively available is an FTP over SSH (SFTP or SCP) protocol.

15. A method as recited in claim 11, wherein said step of configuring at least one processor of said one or more processors to establish a secure link across said network includes transmission of authentication credentials using an application level protocol from the client.

\* \* \* \* \*